US011468631B2

(12) United States Patent
  Ore (10) Patent No.: US 11,468,631 B2
(45) Date of Patent: Oct. 11, 2022

(54) SYSTEM FOR NAVIGATING IN CAVITIES

(71) Applicant: Moshe Ore, Alfey Menashe (IL)

(72) Inventor: Moshe Ore, Alfey Menashe (IL)

( * ) Notice: Subject to any disclaimer, the term of this patent is extended or adjusted under 35 U.S.C. 154(b) by 0 days.

(21) Appl. No.: 17/382,437

(22) Filed: Jul. 22, 2021

(65) Prior Publication Data

US 2022/0036645 A1     Feb. 3, 2022

Related U.S. Application Data

(60) Provisional application No. 63/057,305, filed on Jul. 28, 2020.

(51) Int. Cl.
  *G06T 17/00* (2006.01)
(52) U.S. Cl.
  CPC .... *G06T 17/00* (2013.01); *G06T 2207/10028* (2013.01)
(58) Field of Classification Search
  None
  See application file for complete search history.

(56) References Cited

U.S. PATENT DOCUMENTS

| | | | | |
|---|---|---|---|---|
| 2002/0145849 | A1* | 10/2002 | Peterson, III | G06F 1/163 361/679.03 |
| 2020/0217666 | A1* | 7/2020 | Zhang | G01C 21/3848 |
| 2020/0309529 | A1* | 10/2020 | Lambert | G05D 1/027 |
| 2020/0322663 | A1* | 10/2020 | Vaderna | H04N 21/21805 |

OTHER PUBLICATIONS

Zlot et al. "Three-Dimensional Mobile Mapping of Caves", Journal of Cave and Karst Studies, v. 76, No. 3, p. 191-206, Dec. 2014.*
Bellekens et al. "A Benchmark Survey of Rigid 3D Point Cloud Registration Algorithms", International Journal of Advances in Intelligent Systems, vol. 8, No. 1 & 2, pp. 118-127, Jun. 2015.*

* cited by examiner

*Primary Examiner* — Frank S Chen
(74) *Attorney, Agent, or Firm* — Eva Taskel (57) ABSTRACT

A system, apparatus and method, the system comprising: a scanning device for obtaining three dimensional (3D) information about a cavity surrounding a user, the scanning device comprising a localization and mapping device and an inertial measurement unit; an image capture device for capturing images within the cavity; a processor for receiving the information collected by the scanning device and generating a model of the cavity based on the information; and a display device adapted to display to the user a representation of the model of the cavity, and a route taken by the user within the cavity, wherein the scanning device and the display device are adapted to be attached to at least one wearable item, thereby enabling the user to advance with free hands within the cavity.

15 Claims, 8 Drawing Sheets

SYSTEM FOR NAVIGATING IN CAVITIES

CROSS REFERENCE TO RELATED APPLICATION

This application claims the benefit of priority of U.S. Provisional Patent Application No. 63/057,305, filed on Jul. 28, 2020. The foregoing application is incorporated herein by reference in its entirety.

TECHNICAL FIELD

Embodiments of the disclosure relate to mapping areas in general, and to creating and using three dimensional models of cavities, in particular.

BACKGROUND

Navigation in different areas, even for a first time in an unknown area has become significantly easier since Global Positioning Systems (GPS) has been introduced and became widely available. As for mapping spaces and navigating therein, methods and devices exist such as accelerometer measurements, cameras, Wi-Fi networks, or the like. Real-world coordinates within indoor areas can be obtained by combining GPS locations with these techniques. Such relation is particularly required for tasks that involve the real-world coordinates and the internal space.

However, the available methods are limited in their abilities and accuracy. Moreover, such solutions cannot be used for navigating within a new unexplored area, particularly when the area is complex, for example contains twisted corridors, turns, intersections, smaller cavities or the like, such as a tunnel system, a mine, or the like. Further complications may arise when the area is dark. Using flashlight or another light source may help, but does not solve the problem completely, since such a light source can also create confusing shadows in such environment, and is limited in its intensity and/or illumination direction.

Naturally, a person exploring such areas needs to be cautious and may need to use his hands, for not colliding with walls or objects, protecting his head, holding one or more objects such as a flashlight, a weapon, or the like.

BRIEF SUMMARY

One exemplary embodiment of the disclosed subject matter is a system, comprising: a scanning device for obtaining three dimensional (3D) information about a cavity surrounding a user, the scanning device comprising a localization and mapping device and an inertial measurement unit; an image capture device for capturing images within the cavity; a processor for receiving the information collected by the scanning device and generating a model of the cavity based on the information; and a display device adapted to display to the user a representation of the model of the cavity, and a route taken by the user within the cavity, wherein the scanning device and the display device are adapted to be attached to a wearable item, thereby enabling the user to advance with free hands within the cavity. Within the system, the processor is optionally further adapted to generate a two dimensional (2D) model of the cavity and wherein the display device is adapted to display a view of the 2D model. Within the system, the display device is optionally further adapted to receive from the user an indication to an area of the cavity, and display an image captured by the image capture device depicting the area. Within the system, the wearable item optionally comprises a wrist case, a vest, glasses or a helmet to which the display device attaches. Within the system, the wearable item comprises a vest to which the scanning device attaches. The system can further comprise a data storage device for storing data output by the scanning device and images captured by the image capture device. Within the system, the data storage device is optionally adapted to be attached to the at least one wearable item. The system can further comprise a communication module for transmitting information collected by the scanning device to a remote computing device. Within the system, the remote computing device is optionally adapted to generate a three dimensional model of the cavity. The system can further comprise a processor for determining a projection of the 3D information onto a two dimensional map. The system can further comprise a positioning system for obtaining real world coordinate of an entrance point to the cavity, and wherein a location of at least one point within the cavity can be determined from output of the scanning device and the real world coordinate of the entrance point. The system can further comprise a rover member of the positioning system, and a frame wherein at least the scanning device, the image capture device and the rover member are attached to the frame. Within the system, location of the system is optionally obtained when the system is at a same location for at least a predetermined duration of time starting at a certain point in time, and wherein the location is stored in association with data output by the scanning device captured during the predetermined duration of time after the certain point in time.

Another exemplary embodiment of the disclosed subject matter is an apparatus, comprising: a moving platform having installed thereon: a scanning device for obtaining three dimensional (3D) information about a cavity surrounding the moving platform, the scanning device comprising a localization and mapping device and an inertial measurement unit; an image capture device for capturing images within the cavity; and a communication device for transmitting to a remote location the 3D information; a processor for receiving the information collected by the scanning device and generating a model of the cavity based on the information; and a display device adapted to display to the user a representation of the model of the cavity, a route taken by the moving platform within the cavity, or an image captured by the image capture device depicting an area corresponding to a location pointed at by a user. Within the system, the moving platform is optionally remotely stirred in accordance with the information as received at the remote computing platform.

Yet another exemplary embodiment of the disclosed subject matter is a method comprising: receiving from a scanning device 3D information about a cavity, the scanning device comprising a localization and mapping device and an inertial measurement unit; generating a 2D model of the cavity based on the 3D information; and displaying in real time or near real time to a user in the vicinity of the scanning device, a view of the 2D model. The method can further comprise: obtaining a location of the system when the system is at a same location for at least a predetermined duration of time starting at a certain point in time; and storing the location in association with data output by the scanning device captured during the predetermined duration of time after the certain point in time.

BRIEF DESCRIPTION OF THE SEVERAL VIEWS OF THE DRAWINGS

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

One technical problem handled by the disclosure relates to navigating within cavities or internal spaces, which may or may not have a line of sight to satellites, and therefore may or may not use Global Navigation Satellite System (GNSS) such as global positioning systems (GPS). Such cavities may include natural cavities such as caves, as well as manmade cavities such as mines, tunnel systems, or the like. In particular, dark and complex cavities, for example cavities comprising junctions, twisted or branched corridors, objects located within the space, or the like may make even an experienced navigator to lose track of where he is in the complex, what areas have and have not been explored, how to move forward, and how to get back to the exit. Another example of areas to be explored may include wrecked buildings or objects, such as building collapsed due to earthquakes or other reasons. GPS may be available in some part of these areas, while in others it may not. Either way, it may be required to move within the spaces looking for survivors. Naturally, no mapping exists for such structures in their demolished state, while on the other hand time is of essence and it is required to act fast and scan the cavities efficiently.

In some embodiments, it is required to enable an explorer of a cavity to move hands-free within the cavity, such that he can walk through narrow openings or corridors, and use his hands for other purposes such as stabilizing, protecting himself, holding other objects, or the like.

Another technical problem relates to obtaining and maintaining reliable data about the structure of the cavity, including walls, corridors, ceiling, objects therein or others, also after mapping is completed. The maintained data can then be used for planning near and far future activities, realizing areas that have not been fully explored, determining access ways to the cavity, or the like.

Yet another technical problem relates to associating locations within the cavity with real world coordinates. Such technical problem may arise, for example, when it is required to drill from the surface into a cavity such as a mine or a tunnel, in order to access a specific area thereof. Further activities may require a combined map, which comprises over-ground and underground data of an area, for example showing the projection of the space relatively to surface objects in the area, such as houses. This structure may be used to determine existing access ways to the underground cavities, for planning activities in the area, or planning new access ways. One particular use relates to mapping of a structure, such as a building, a bridge, a wall, or the like, wherein said mapping comprise absolute coordinates.

The discussion below uses interchangeably the terms "cavity", "area", "non-exposed area" and "internal space" to relate to areas, wherein locations within the area do or do not have access to global positioning system, satellites or other devices, and wherein the locations are underground or above ground.

One technical solution comprises a system including a carried device, and an interface device, such as a Mobile Operator Interface (MOI), wherein a user may carry both inside the cavity. The carried device may comprise a scanner for mapping cavities, such as a localization and mapping device and in particular Simultaneous Localization and Mapping (SLAM) device, and an inertial measurement unit (IMU) for analyzing the route the user is traversing in the cavity and determining relative locations within the cavity. In some embodiments of the disclosure, the system may also comprise a GNSS device, wherein the carried device may comprise the rover member of a GNSS system, while the base member of the GNSS system may be located elsewhere, for example at or near the entrance to the cavity. Prior to entering the cavity, the base member can acquire and provide to the rover member the exact absolute location. In non-exposed areas, the rover member may be of no use and may thus be detached from the system in order to reduce the system weight and volume. However, if the cavity is exposed to satellites, then the user can carry the GNSS rover and an absolute location of the user can be continuously acquired during the stay in the cavity. Otherwise, the location may be assessed based on the initial location obtained upon entering the cavity, and the IMU data.

In some embodiments of the disclosure, a user may carry the carried device by hand. However, the carried device may additionally or alternatively be adapted to be secured to a wearable item the user is wearing, such as a vest. The MOI may be secured to the user's wrist, similarly to a watch, such that the user can look at his wrist in the same way a person is looking at his watch, and see a model of the cavity, his route within the cavity, and optionally additional information.

The system may also comprise additional components such as a data logger which may be a storage device adapted to log the data collected by the scanning device such as the point cloud produced by the SLAM, and/or the IMU readings; a battery pack; an image capture device, or others, which may also be fitted on the vest or otherwise carried by the user.

In some embodiments, the user may hold the carried device in his hand and reach out into an opening. The user can then look at the MOI and view the opening structure and images, to determine whether the opening leads in a direction worth exploring, or is a dead end, and there is no need to attempt to advance in that direction.

The capture device may capture images which may also be stored within the data logger. Each such image may be associated with a time stamp and/or with a relative or absolute location within the cavity. On future explorations of the cavity as a user advances within the cavity, images relevant for each location may be retrieved, such that the user can compare the retrieved images to the current view in order to make sure he is on the right place, determine whether changes have occurred, or the like. The images may also be used by another user examining the model.

The system may enable the user to explore the cavity and receive a visual description of the cavity structure and the user's route as obtained from the SLAM and the IMU, for example over the MOI, wherein the visual description develops as the user advances. The visual description is particularly important in dark areas, and for enabling the user to determine areas he would like to explore further, turns he would like to take, find his way out, or the like.

Another technical solution comprises the determination of a location of the device, whether by the GNSS rover, if it has line of sight to satellites, or by combining the absolute location at the entrance to the cavity, and accumulating the changes through the reports by the IMU and/or the SLAM. For example, the location may be obtained every predetermined period of time for example 10 seconds, one minute, or the like, or after the device is at a location for at least a predetermined period of time and does not move, for example for 10 seconds.

The obtained location may then be stored and associated with the relevant data taken at that time, for example the point cloud provided by the SLAM, the location provided by the IMU, the images, or the like, such that some locations or points in time may be associated with a known location.

Yet another technical solution comprises the usage of the obtained structure, also referred to as model, for further exploration of the cavity, especially with the route of a new exploring user being marked on the existing structure.

The system may further comprise one or more remote interfaces, such as one or more local operator interface (LOI) positioned, for example, near the entrance to the cavity, and/or one or more commander operator interface (COI) located anywhere. The remote interfaces may display the structure of the cavity and the user's route therein as uncovered during the user's advancement, or the complete structure of the cavity, images captured by the capture device, absolute or relative locations, or the like. It will be appreciated that the data may be displayed at a later time, after the user has exited the cavity, and if the system is in communication with any of the remote interfaces, then also in real time or near real time as the user is exploring the cavity. The cavity structure may be displayed in two dimensions (2D) or three dimensions (3D) and may be used for planning operations such as planning how to use the cavity, distances, access ways, or the like.

One technical effect of the disclosure is providing a hands-free navigation system for exploring a cavity, such that the user's hands remain free for other needs. The user can see a model of the area he is currently at, as well as areas he has previously been at, the route he took, additional turns to be considered, and the way back to the exit.

Another technical effect of the disclosure is that since the structure of the cavity and the route are displayed on a display device, such as the LOI, the user can navigate within the cavity in the dark, without having to turn on additional light, thus avoiding being discovered, disturbing animals, hitting walls or other objects or the like. The user can thus advance or backtrack in the dark according to the shown structure.

Yet another technical effect of the disclosure is the online and offline availability of the obtained structure, for current and further planning of further actions or explorations.

Yet another technical effect of the disclosure is that real world coordinates of locations and objects within the cavity, such as a projection of the cavity on a two dimensional map of the area, as well as depth information can be obtained, thus enabling the planning of accessing the cavity from above for various needs.

Figure 1:
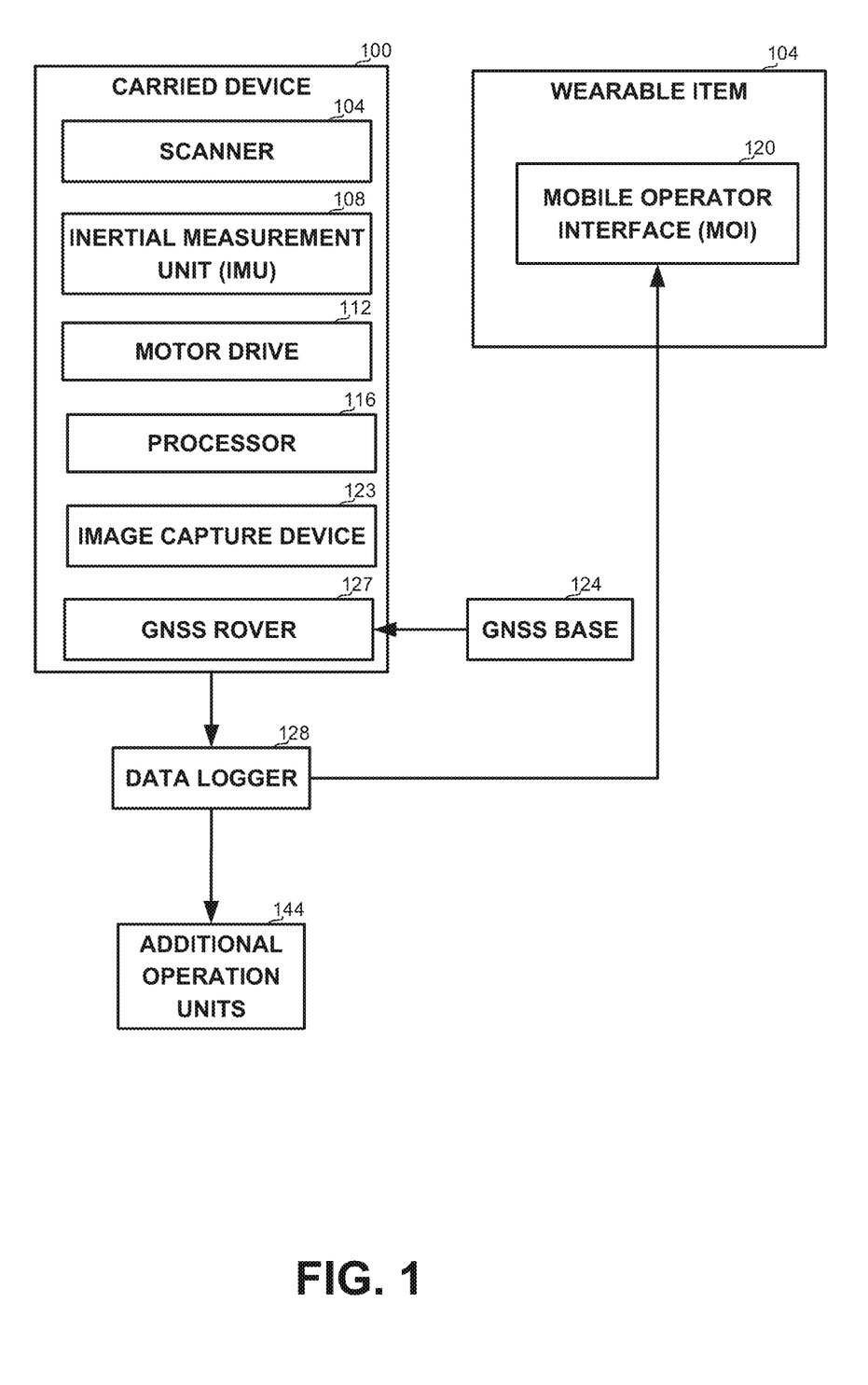
FIG. 1 shows a schematic functional block diagram of a system, in accordance with some exemplary embodiments of the disclosure.

Referring now to FIG. 1, showing a schematic functional block diagram of a system in accordance with the disclosure.

The system may comprise carried device 100, which a user may carry by hand, or attach to a wearable item such as a vest. The system may further comprise a mobile operator interface (MOI) 120, which may be set within a wearable item 104, such as a wrist case, mounted on the user's head, connected to glasses, helmet, a vest, or the like.

The system may further comprise a data logger 128 for collecting data from carried device 100, store it and optionally provide it to other components, such as MOI 120 for display. The data may also be provided to additional operation units 144, such as LOI, COI, or the like. Data logger 128 may also be attached to wearable item of the user, or carried upon a drone, a small vehicle or an animal back, or the like. Carried device 100 may also be carried by a drone, a small vehicle or an animal back, or the like.

In some embodiments, processor 116 or a processor of MOI 120 may generate a model, such as a two dimensional model of the cavity, upon the raw data received, directly or indirectly, from scanner 124. MOI 120 may then display to the user, in real time or near real time a view of the model. MOI 120 may then display to the user additional information, such as intelligence-related information received from a remote source. The information, provided to MOI 120, determined by MOI 120, stored within the data logger, or the like, may also be transmitted to remote locations, such as LOI, COI or others.

Additional operation units 144 may also receive the raw data, in real time or at a later time, and may generate a three dimensional model of the cavity, and display a view of the three dimensional model on a display device of the LOI, COI, or any another display device. The information may be displayed with images, exact location as described above, or the like.

The system may further comprise GNSS base member 124, for determining exact absolute location, for example by receiving signals from 3-5 satellites.

The communication routes and protocols are further detailed in association with FIG. 5 below.

Figure 2:
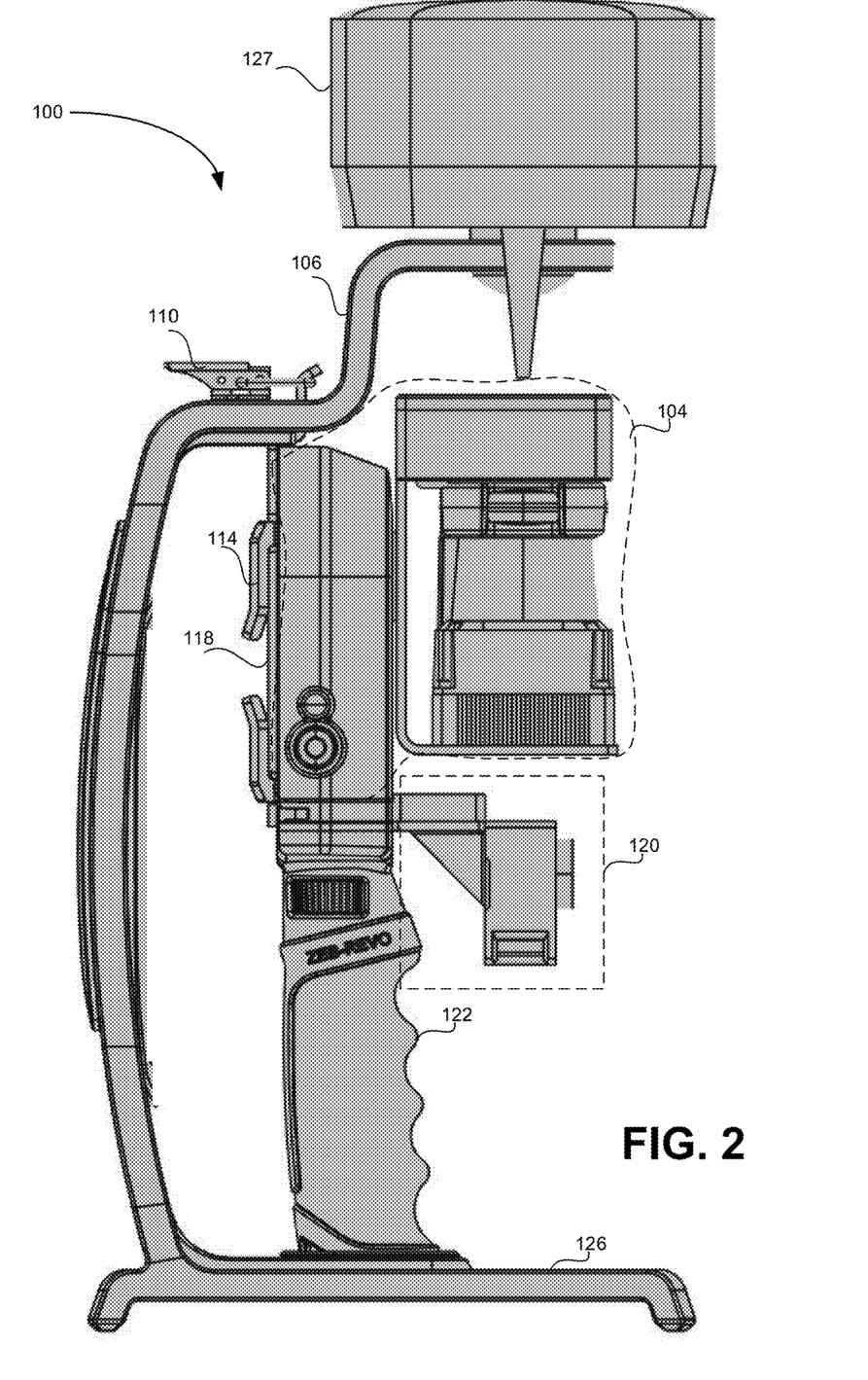
FIG. 2 shows a schematic illustration of a carried device, in accordance with some exemplary embodiments of the disclosure.

Referring now also to FIG. 2 showing a schematic illustration of carried device 100.

Carried device 100 may comprise a scanner 104, which may be a SLAM device for obtaining the structure of a cavity the user is in. The SLAM device can use the point cloud technique to depict the objects in its vicinity, including for example walls, corridors, openings, stairs, floor, pits, ceilings, and objects therein. One example for such device is GeoSlam by Bingham, Nottinghamshire, UK. The SLAM device may scatter a multiplicity of laser beams, for example over 40,000 beams per second each hitting the nearest object in its direction, receive the returned signals, compute the distance to the object in that direction, and thereby obtain a model of the area.

Carried device 100 may comprise an IMU 108. Scanner 104 and IMU 108 may be functionally, electronically and/or mechanically coupled, and in some embodiments, IMU 108 may be embedded within scanner 104. Scanner 104 or IMU 108 may comprise a motor drive 112 for rotating scanner 104 such that the point cloud spreads around scanner 104 and is not limited to certain directions. Scanner 104 may be rotated continuously by motor drive 112, and as it is being rotated and also moved by the movement of the user, the area is continuously mapped and a model of the traversed area is constructed based on the point cloud.

IMU 108 may be any motion sensor, for example an accelerometer. Upon analysis of the measures provided by IMU 108, the advancement of the user within the cavity may be assessed and combined with the measures taken by scanner 104, to provide the user's location at any given time within the cavity structure.

Carried device 100 may further comprise processor 116 for processing and integrating the scanning results. The processor may be embedded within scanner 104 or IMU 108. In other embodiments, processor 116 may be external to scanner 104 and IMU 108, and may receive and integrate further information such as images. In further embodiments, processor 116 may be implemented by two or more processors, for example one or more processors within scanner 104, and one or more additional processors for integrating the readings with additional data such as relative or absolute coordinates, building a 3D model of the cavity, and displaying the model and optionally the images in one or more ways over a display device such as MOI 120.

In some embodiments, carried device 100 may comprise additional sensors, such as a gas detector, explosive sensor, or the like, and the view displayed over MOI 120 or over other display devices may also comprise indications to gasses, explosives, or the like.

It will be appreciated that further components of the system may comprise additional processors, for example the COI and LOI may comprise processors for executing further data integration, enhancing the models, and displaying the models and additional information.

Carried device 100 may also comprise an image capture device 123, such as a camera, a video camera, a GoPro® camera, a thermal camera, or the like.

Carried device 100 may comprise frame 106, which may have a base 126, for putting carried device 100 in a stable manner over a surface.

Scanner 104 and image capture device 123 may be attached to a holder 118, having a handle 122, and vest clips 114, wherein holder 118 is connectable to frame 106.

Carried device 100 may comprise a GNSS rover 127, which is useful in determining the location of device 100 subject to having a line of sight to satellites.

In some situations, for example in underground or closed cavities, there is no line of sight to satellites, therefore GNSS rover 127 is useless and only makes carrying device 100 less comfortable. In such situations, lock 110 may be used to release holder 118 from frame 110, leaving only holder 118 with handle 122, scanner 104 and capture device 123.

Figure 3A:
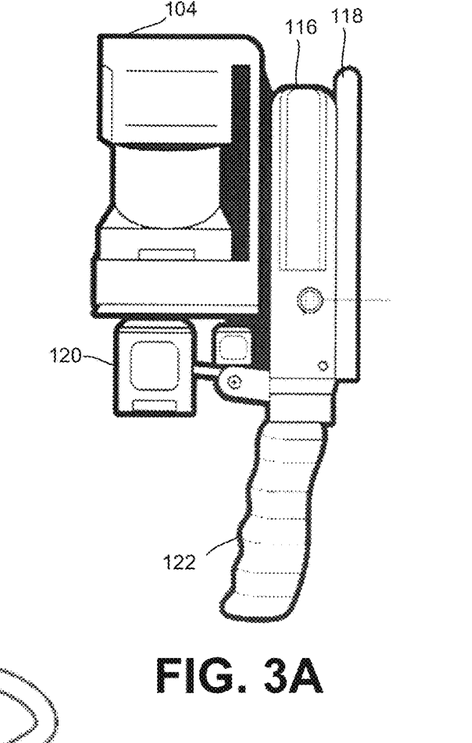
FIG. 3A shows a side view of carried device without GNSS rover and without a frame, in accordance with some exemplary embodiments of the disclosure.
Figure 3B:
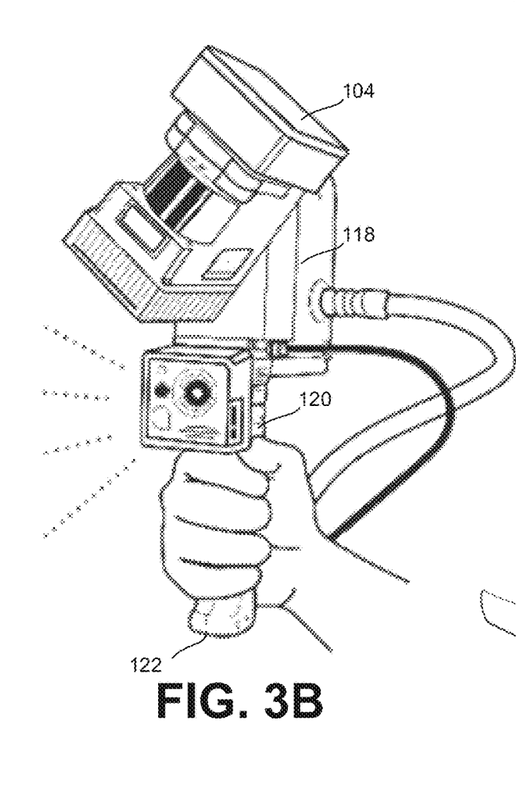
FIG. 3B shows a user holding the device by s handle with the scanner and the capture device attached to a holder, in accordance with some exemplary embodiments of the disclosure.

FIG. 3A shows a side view of carried device 100 without GNSS rover 127 and without frame 106, and FIG. 3B shows a user's hand holding the device by handle 122 with scanner 104 and capture device 123 attached to holder 118.

When holding carried device 100 by handle 122, a user can reach out his hand holding carried device 100 into an opening, such that scanner 104 and capture device 123 can capture the structure and images of the opening. The user can then decide whether to advance into the opening or not.

In some embodiments, the user can attach carried device 100 to an adapted wearable item, such as a vest. Carried device 100 can be attached to the vest using vest clips 114.

Figure 3C:
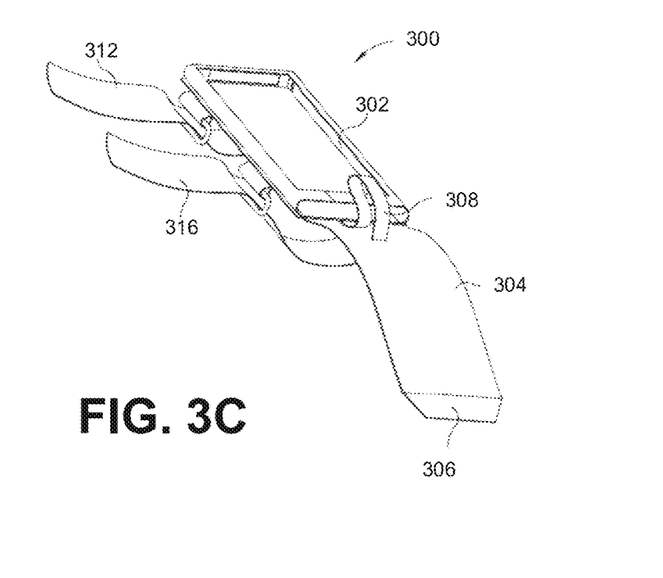
FIG. 3C shows an illustration of an exemplary wearable item being a wrist case for holding the display device, in accordance with some exemplary embodiments of the disclosure.

Referring now to FIG. 3C, showing an illustration of an exemplary wearable item 104 being a wrist case for attaching MOI 120 to a user's wrist, in accordance with some embodiments of the disclosure.

Wearable case 300 comprises compartment 302, having an open face corresponding in size to the size of the display of MOI 120. Wearable case 300 may also comprise strap 308 for attaching MOI 120 the case, and wider strap 304 for covering the display, so that it does not dazzle the user, does not get scratched, or the like. Strap 304 may comprise at its end a flap 306, which may be covered with a Velcro® patch, or the like.

Wearable case 300 may also comprise one or more straps to be tied around the user's wrist. For example, strap 312 and strap 316. In some embodiments, strap 316 may be tied in a more distal location than strap 312, and may thus be shorter than strap 312.

Wrist wrapper 104 may hold MOI 120 within compartment 302/MOI 120 may be a computing platform with a display device, for example a smartphone having a display as large as possible which can still be comfortable on a user's wrist, for example a mobile phone of up to 7" diagonal. The user can thus view on the display device the structure of the cavity and the user's route within the cavity, without holding an object in the user's hand. In some embodiments, an application or module executed by MOI 120 may render a display of the cavity structure and the user's route.

Data logger 128 may also be connected to wearable case 300, for example by any standard pouch connectable to wearable case 300, on either side of wearable case 300, for example to any of straps 404 or 408, or otherwise harnessed to wearable case 300. In further embodiments, data logger 128 can be connected to a shoulder strap, such that the user can carry data logger 128 on its shoulder rather than connect it to wearable case 300.

In some embodiments, instead of wrist wrapper 104, a chest display holder may be used, which holds a display device near the user's torso, such that the user only needs to lower his eyes to see the display. In further embodiments, the display device may be attached to a pair of glasses, to a helmet, or to any other device.

It will be appreciated that carried device 100, MOI 120 and data logger 128 may also be fitted on wearable items other than a vest or a wrist case, such as a pants, a coat, a helmet or the like.

Figure 4:
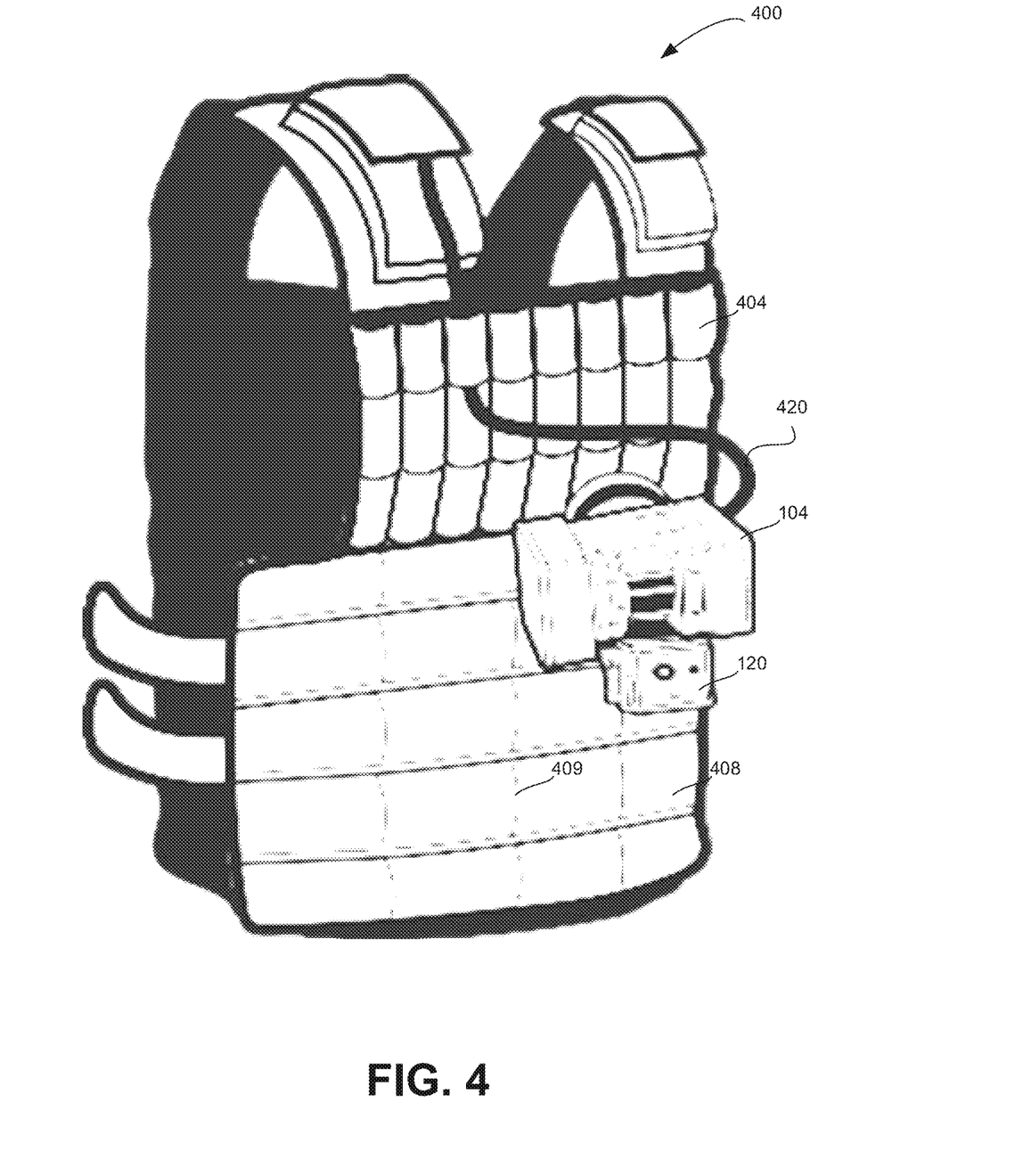
FIG. 4 shows an illustration of wearable item being a vest, to which the scanning device attaches, in accordance with some exemplary embodiments of the disclosure.

Referring now to FIG. 4, showing vest 400. Vest 400 may be any vest, such as a Modular Lightweight Load-Carrying Equipment (Molle) vest. Vest 400 may have one or more horizontal straps such as straps 408 sewn to vest 400 on their lower side and having separating seams 409, one or more straps having their top and/or bottom sides open such as straps 404, or the like.

Scanner 104 can connect to holder 118, which can connect to one of straps 408 on the front side of vest 400. Thus, scanner 104 and capture device 123 may be forward directed, according to the advancement direction of the user wearing vest 400. However, they may also be attached to the back side of the vest.

Data Logger 128 can be placed in any pouch and attached to vest 400 on either side. Scanner 104 can connect to data logger 128 via cable 420 which may be secured by threading through any of straps 404.

It will be appreciated that further elements may be connected to vest 400, such as a pouch comprising a battery pack, or the like.

MOI 120 may be implemented as a mobile device, such as but not limited to a mobile phone, a tablet, or the like.

Figure 5:
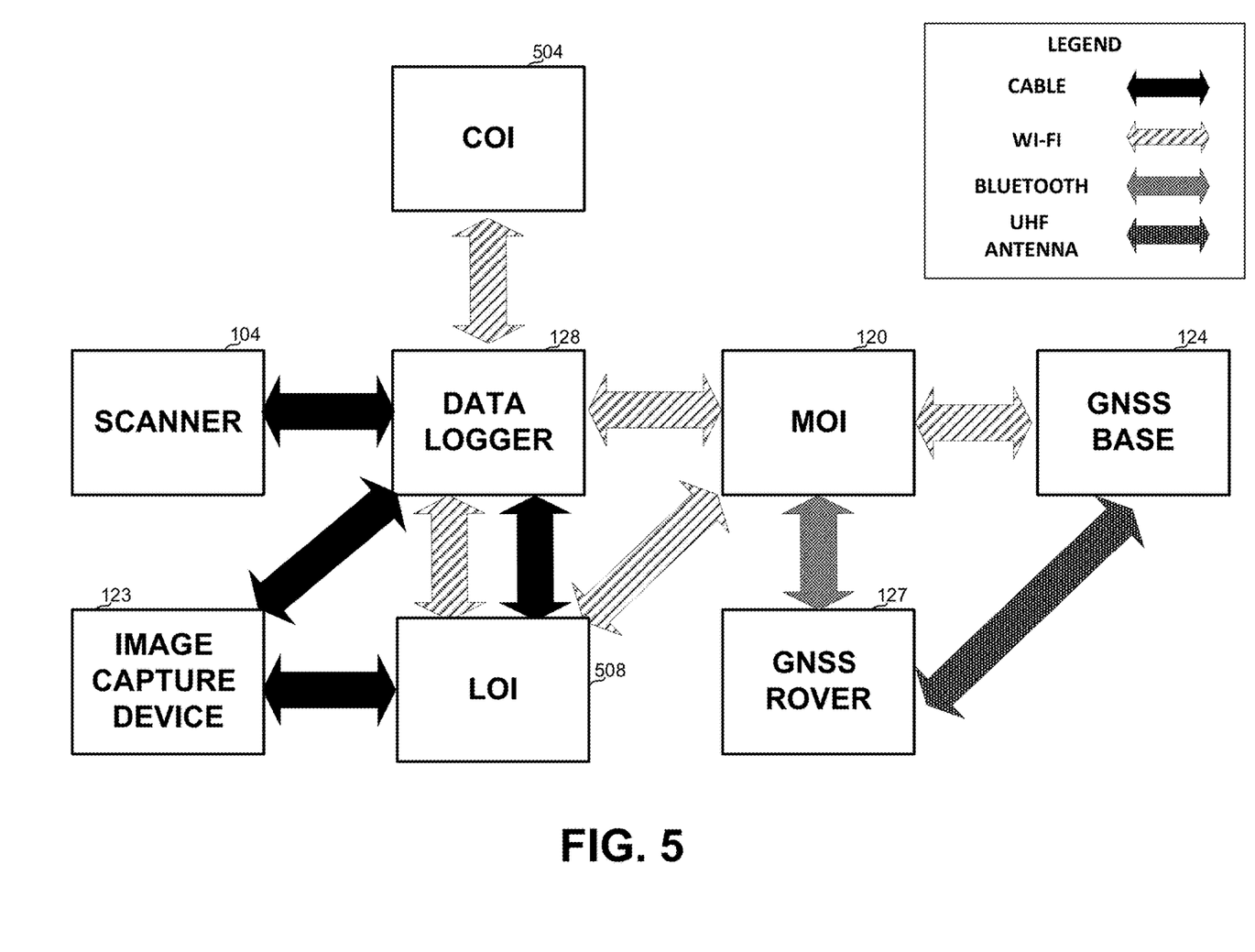
FIG. 5 shows the control and data transfer between the system units, and the relevant protocols, in accordance with some exemplary embodiments of the disclosure.

Referring now to FIG. 5, showing the control and data transfer between the system units, and the relevant protocols thereof.

Data from scanner 104, including point cloud data as well as data from IMU 108 may be provided to data logger 128 for storage, using, for example cable communication. Similarly, data from image capture device 123 including captured images may be provided to data logger 128 also using wired communication. In some embodiments, a single cable may connect data logger 128 to scanner 104 and image capture device 123. The cable may connect, for example, to holder 118 to which scanner 104 and image capture device 123 may connect mechanically and electrically. It will be appreciated that the cable may also provide power from image capture device 123 to scanner 104 and to image capture device 123.

Images captured by image capture device 123 may also be provided to LOI 508 through wired communication, which may be established after the user exited the cavity, or is otherwise able to connect image capture device 123 and LOI 508.

Data logger 128 may provide information to and optionally receive commands from LOI 508 using wired communication, or Wi-Fi communication, when available.

Data logger 128 may provide information to and optionally receive commands from COI 504 using Wi-Fi communication, when available.

MOI 120 may communicate with LOI 508, data logger 128 and GNSS base 124 through Wi-Fi communication, when available.

GNSS base 124 and GNSS rover 127 may connect through any appropriate channel, such as a UHF antenna.

GNSS base 124 may communicate with MOI 120 using Wi-Fi communication.

It will be appreciated that the communication channels and protocols above are exemplary only, and other channels and protocols may be selected, as long as they enable receipt and storage of the data collected when the user traverses the cavity, and usage thereof at any later time by any required device.

Any of interface devices COI 504, LOI 508 and MOI 120 may display the cavity structure based on the point cloud, optionally with the user's route. Upon pointing at a specific location, an image captured by image capture device 123 at the point may be displayed, which shows the view as seen from the associated location.

The information from data logger 128 may also be transmitted over any communication channel such as Wi-Fi, cellular communication, RF, or the like to any other computing platform, such as a server, a desk top computer, a laptop computer, or the like.

Depending on the type of the communication channel, the data may be transmitted online when received by data logger 128 and/or image capture device 123, or only once the user and carried device 100 are out of the cavity and communication is enabled. The computing platform, which may be COI 504 or others may be used for displaying or investigating the structure obtained by scanning device 104.

The computing platform may be further used for projecting coordinates of locations of the cavity, for example the boundaries of the cavity onto the ground level, and displaying them with additional available data. The computations may be distributed between a number of computing platforms, which may or may not include COI 504, and computation products may be shared.

Prior to entering the cavity, GNSS base 124 may obtain accurate positioning information and communicate it to GNSS rover 127. This process may take some time, for example up to 40 minutes. Once the position is established, GNSS rover, if it has a line of sight to satellites may continue obtaining accurate positions and associated each such position with a time stamp, for synchronizing with a point cloud and with an IMU reading. Thus, the user exploring the cavity may stop from time to time, for example for 10 seconds, during which a point cloud is generated, one or more images may be taken, an accurate position is acquired, and all the data above is synchronized with a time stamp. If no line of sight exists, the absolute location may be assessed form the location at the entrance to the cavity and the IMU readings and processing thereof.

In some embodiments, instead of the wearable units, all components may be installed on a moving platform, such as a car, a motorized platform, a robotic platform, or the like, which may be self-stirring, remotely controlled or remotely driven. The apparatus, comprising all components may then capture and process data as described, and may collect and store the data for example on a data logger and/or transmit the data to a remote location by a communication device using any protocol, such as Wi-fi, cellular, wired, or the like. The data may then be displayed at the remote site on a display device, such as a computer screen, a television, an LCD display, or the like. The displayed data may be used, automatically or manually, for further driving or stirring the platform.

Experimental Results

Figure 6:
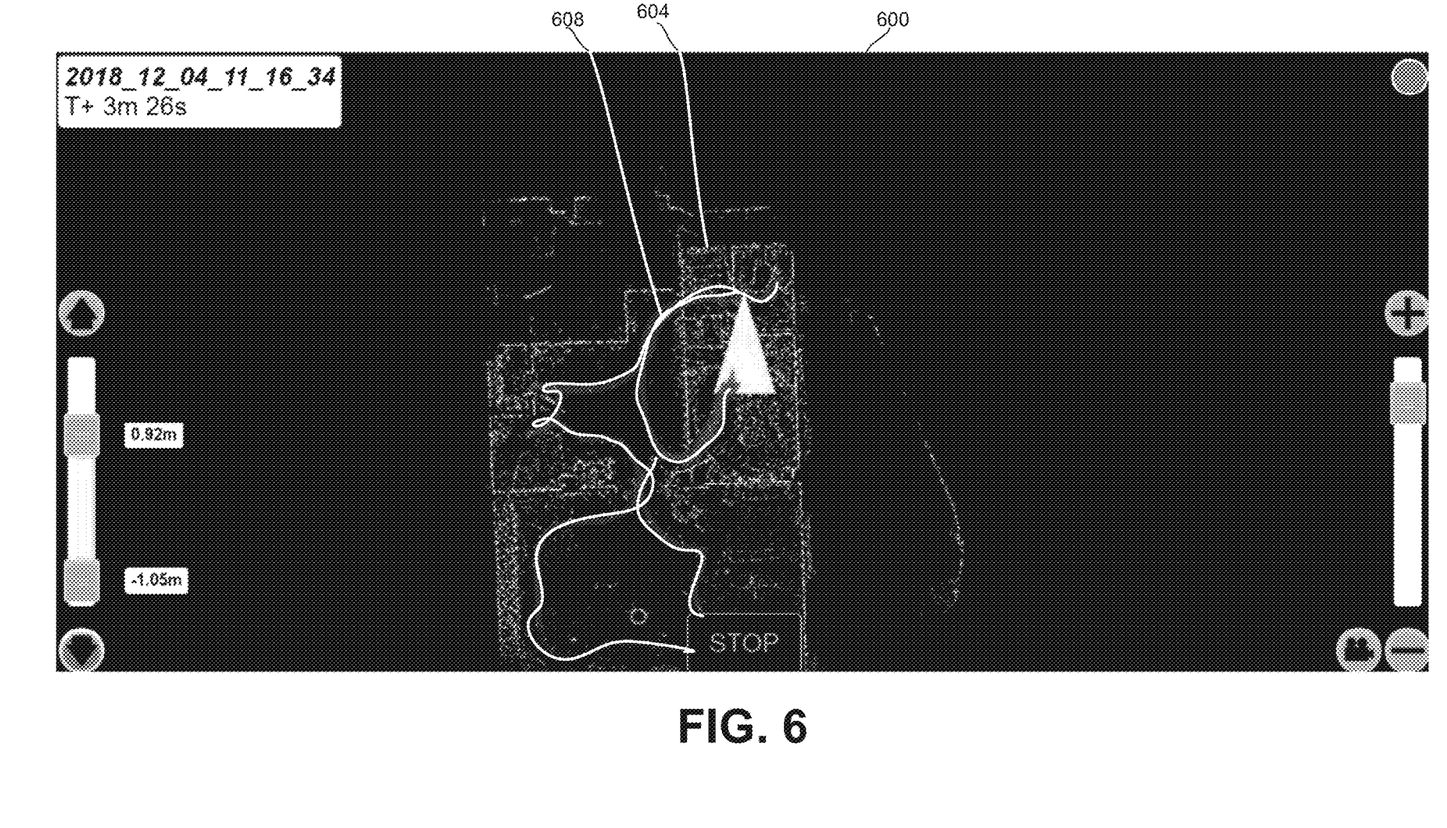
FIG. 6 shows an illustration of an exemplary two dimensional view of the cavity and the user's route therein, in accordance with some exemplary embodiments of the disclosure.

Referring now to FIG. 6, showing an exemplary view 600 of 2D model of a cavity structure, and the user's route therein, as may be displayed to a user over MOI 12-during exploration, or over COI 504 or LOI 508 during exploration or at a later time, in accordance with some embodiments of the disclosure. The cavity is shown in the form of a point cloud, wherein each wall or another scanned object is shown as a concentration of points 604, and the user's route is shown as path 608. The user can thus view the structure, and may know which areas have not been sufficiently explored, how to exit the cavity, or the like.

Figure 7A:
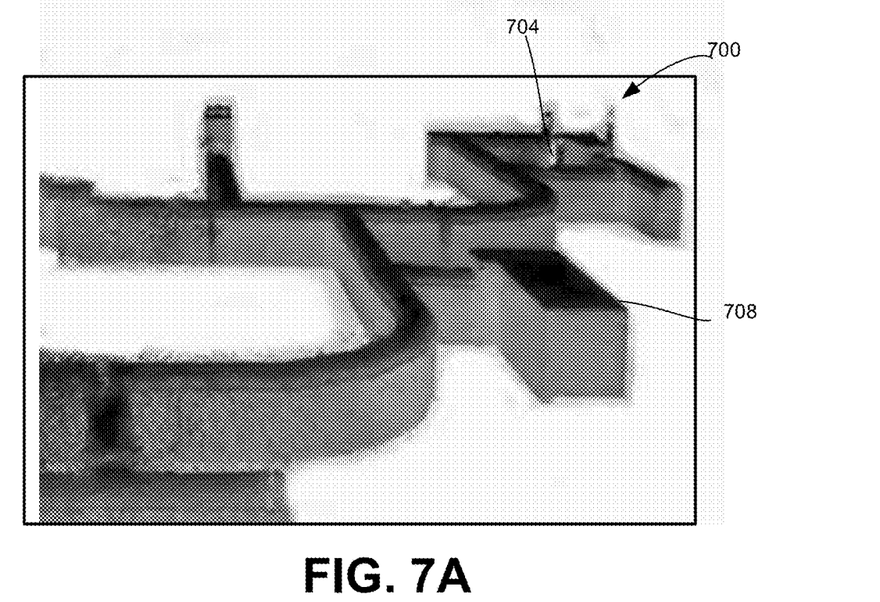
FIG. 7A shows an exemplary 3D model of an underground tunnel system, in accordance with some embodiments of the disclosure.

Referring now to FIG. 7A, showing an exemplary 3D model 700 of an underground tunnel system as obtained by the scanning device used by a user traversing the tunnel system, in accordance with some embodiments of the disclosure. The 3D model enables any manipulation, such as rotation, zoom, selecting a point of view within any of the cavity areas such as area 704, or the like.

Some of the areas, for example area 708 may have been obtained without the user going into a part of the cavity, but only reaching out his hand with carried device 100, such that the point cloud captures the shape of the area, and one or more images are taken.

When the user clicks on some points in the model, a 2D image obtained by image capture device may be displayed. In some embodiments, a direction indicator may be presented over the model, showing the look direction of the camera when the image was taken.

In some embodiments, each point in the model may be associated with absolute coordinates, for example by adapting the relative coordinates collected by the IMU 108 to absolute coordinates acquired by GNSS base 124 before going into the tunnel system.

Figure 7B:
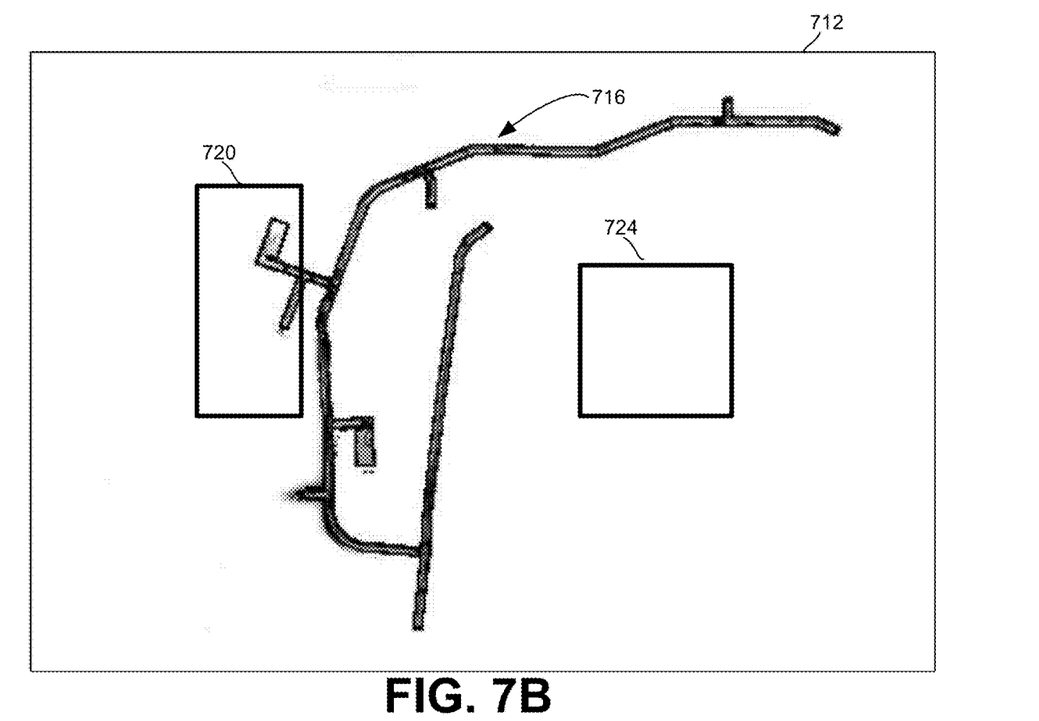
FIG. 7B shows a map comprising a projection model of a cavity on the ground level, and objects in the vicinity of the cavity, in accordance with some embodiments of the disclosure.

Referring now to FIG. 7B, showing a map 712 comprising a projection 716 of a model of a cavity such as an underground cavity, on the ground level, as well as buildings or other objects in the vicinity of the cavity, such as buildings 720, 724. A user wishing to drill at a specific location within the cavity can thus navigate on the ground surface using the map to that location, and drill exactly at the required location. Alternatively, the user can drill at another location above the cavity, and proceed within the cavity to the required location. As shown in map 712, the 3D cavity structure may be scaled and projected onto a two dimensional map, wherein the map can be used for planning penetration into the cavity, operations within the cavity or the like.

Figure 8A:
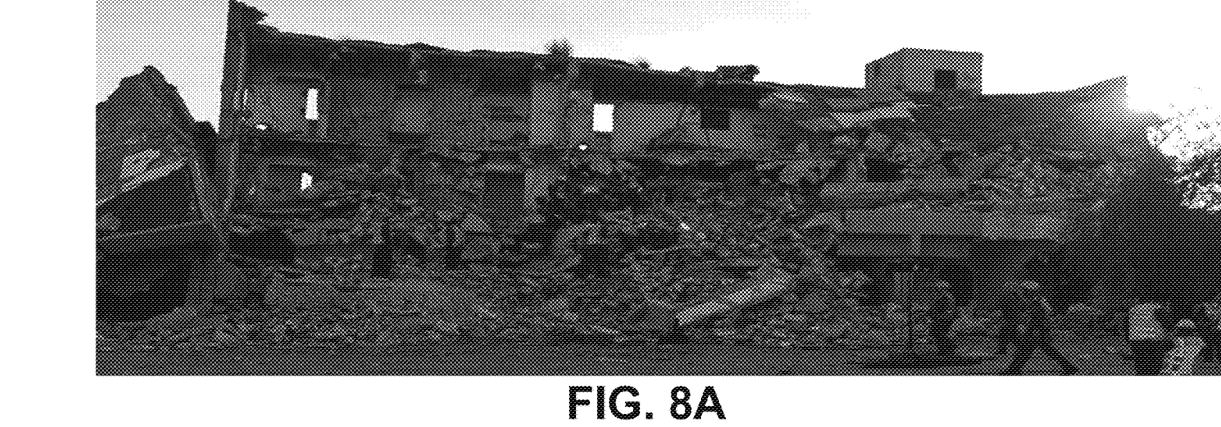
FIG. 8A is an image of a side view of a demolished building.
Figure 8B:
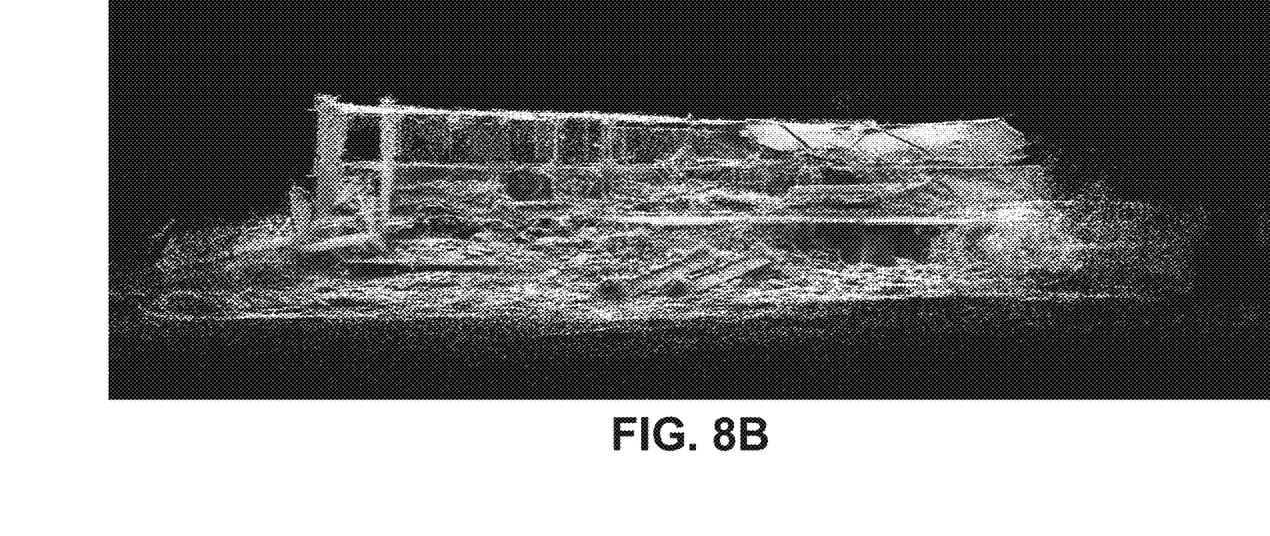
FIG. 8B is a side view of the 3D model of the demolished building of FIG. 8A, in accordance with some embodiments of the disclosure.

Referring now to FIG. 8A, showing an image of a side view of a demolished building, and FIG. 8B showing a side view of the 3D model of the same. The 3D model enables virtual traversing of any point in the building, including hidden cavities which a person could not get into but could reach out his hand, obtain a 3D structure as well as images, and thereby search for survivors or bodies. The 3D model enables intensive examination of the building and efficient planning of the next steps.

The system thus provides for extensive exploration and assessment of all types of cavities, with or without GNSS reception, regardless of the lighting conditions, and even if only a small opening is available to some parts.

The generated model and image enable planning of further traversals of the cavity, whether through the same entrance or a different The system may be used hands-free, thus freeing the user's hands to other purposes, such as stabilization, protection, or the like.

In some embodiments, the components may be located on a moveable platform within the cavity. The scanning device and the IMU may transmit the sensed data to a computing platform, located for example outside or in the vicinity of the cavity. A processor associated with the computing platform may generate a 2D or 3D model and may present a view of the model to a user over a display device. The user may then transmit stirring instructions to the platforming accordance with the model.

In some embodiments, a method may be performed by a computing platform of a carried device, the method comprising: receiving from a scanning device 3D information about a cavity, the scanning device comprising a localization and mapping device and an inertial measurement unit; generating a 2D model of the cavity based on the 3D information; and displaying in real time or near real time to a user in the vicinity of the scanning device, a view of the 2D model.

The figures illustrate the architecture, functionality, and operation of possible implementations of systems and devices according to various embodiments of the present disclosure. In this regard. It should also be noted that, in some alternative implementations, the functionality provided by the different components may be achieved using similar or other components, different materials or different dimensions without deviating from the principles of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any combination of one or more components may be utilized.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed.

Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system, comprising:
   a scanning device for obtaining three dimensional (3D) information about a cavity surrounding a user, the scanning device comprising a localization and mapping device and an inertial measurement unit;
   an image capture device for capturing images within the cavity;
   a processor for receiving the information collected by the scanning device and generating a model of the cavity based on the information; and
   a display device adapted to display to the user a representation of the model of the cavity, and a route taken by the user within the cavity,
   wherein the scanning device and the display device are adapted to be attached to at least one wearable item, thereby enabling the user to advance with free hands within the cavity, and
   wherein the display device is further adapted to receive from the user an indication to an area of the cavity, and display an image captured by the image capture device depicting the area.

2. The system of claim 1, wherein the processor is further adapted to generate a two dimensional (2D) model of the cavity and wherein the display device is adapted to display a view of the 2D model.

3. The system of claim 1, wherein the at least one wearable item comprises a wrist case, a vest, glasses or a helmet to which the display device attaches.

4. The system of claim 1, wherein the at least one wearable item comprises a vest to which the scanning device attaches.

5. The system of claim 1, further comprising a data storage device for storing data output by the scanning device and images captured by the image capture device.

6. The system of claim 5, wherein the data storage device is adapted to be attached to the at least one wearable item.

7. The system of claim 1, further comprising a communication module for transmitting information collected by the scanning device to a remote computing device.

8. The system of claim 7, wherein the remote computing device is adapted to generate a three dimensional model of the cavity.

9. The system of claim 1, further comprising a processor for determining a projection of the 3D information onto a two dimensional map.

10. The system of claim 1, further comprising a positioning system for obtaining real world coordinate of an entrance point to the cavity, and wherein a location of at least one point within the cavity can be determined from output of the scanning device and the real world coordinate of the entrance point.

11. The system of claim 10, further comprising a rover member of the positioning system, and a frame wherein at least the scanning device, the image capture device and the rover member are attached to the frame.

12. The system of claim 10, wherein location of the system is obtained when the system is at a same location for at least a predetermined duration of time starting at a certain point in time, and wherein the location is stored in association with data output by the scanning device captured during the predetermined duration of time after the certain point in time.

13. An apparatus, comprising:
a moving platform having installed thereon:
a scanning device for obtaining three dimensional (3D) information about a cavity surrounding the moving platform, the scanning device comprising a localization and mapping device and an inertial measurement unit;
an image capture device for capturing images within the cavity; and
a communication device for transmitting to a remote location the 3D information;
a processor for receiving the information collected by the scanning device and generating a model of the cavity based on the information; and
a display device adapted to display to the user a representation of the model of the cavity, a route taken by the moving platform within the cavity, wherein the display device is further adapted to receive from the user an indication to an area of the cavity, and display an image captured by the image capture device depicting the area.

14. The system of claim 13, wherein the moving platform is remotely stirred in accordance with the information as received at the remote computing platform.

15. A method comprising:
receiving from a scanning device 3D information about a cavity, the scanning device comprising a localization and mapping device and an inertial measurement unit;
generating a 2D model of the cavity based on the 3D information;
displaying in real time to a user in the vicinity of the scanning device, a view of the 2D model;
obtaining a location of the system when the system is at a same location for at least a predetermined duration of time starting at a certain point in time; and
storing the location in association with data output by the scanning device captured during the predetermined duration of time after the certain point in time.

* * * * *